(12) United States Patent
Angel

(10) Patent No.: US 6,651,867 B2
(45) Date of Patent: Nov. 25, 2003

(54) ROBOTIC TURNTABLE

(75) Inventor: Jeffery R. Angel, Lake Orion, MI (US)

(73) Assignee: Progressive Tool & Industries Co., Southfield, MI (US)

( * ) Notice: Subject to any disclaimer, the term of this patent is extended or adjusted under 35 U.S.C. 154(b) by 0 days.

(21) Appl. No.: 10/154,690

(22) Filed: May 24, 2002

(65) Prior Publication Data

US 2002/0134815 A1 Sep. 26, 2002

Related U.S. Application Data

(62) Division of application No. 09/813,766, filed on Mar. 21, 2001, now Pat. No. 6,435,397.
(60) Provisional application No. 60/197,614, filed on Apr. 18, 2000.

(51) Int. Cl.[7] .............................................. B23K 3/053
(52) U.S. Cl. ..................................................... 228/49.1
(58) Field of Search ................................ 228/49.1, 212, 228/4.1, 47.1; 29/430, 714, 783, 785, 786, 792, 794, 824, 823; 901/42

(56) References Cited

U.S. PATENT DOCUMENTS

| | | |
|---|---|---|
| 4,644,897 A | 2/1987 | Fender |
| 4,682,722 A * | 7/1987 | Bossotto et al. ............. 228/4.1 |
| 4,736,515 A | 4/1988 | Catena |
| 4,795,021 A | 1/1989 | Möller |
| 4,863,092 A | 9/1989 | Nguyen |
| 5,042,125 A | 8/1991 | Harwood et al. .......... 228/49.1 |
| 5,083,070 A | 1/1992 | Poupard et al. |
| 5,111,988 A | 5/1992 | Stickland |
| 5,115,560 A | 5/1992 | Erb et al. |
| 5,150,624 A | 9/1992 | Kaczmarek et al. |
| 5,186,304 A | 2/1993 | Kaczmarek et al. ..... 198/346.1 |
| 5,240,746 A | 8/1993 | O'Connell |
| 5,370,745 A | 12/1994 | Litteral |
| 5,409,158 A | 4/1995 | Angel ......................... 228/182 |
| 5,542,174 A | 8/1996 | Chiu .......................... 172/52.4 |
| 5,560,535 A * | 10/1996 | Miller et al. ................ 228/49.1 |
| 5,640,756 A | 6/1997 | Brown et al. |
| 6,014,851 A | 1/2000 | Daniele et al. |
| 6,065,200 A * | 5/2000 | Negre .......................... 29/430 |
| 6,193,142 B1 | 2/2001 | Segawa et al. ............. 219/127 |

FOREIGN PATENT DOCUMENTS

| | | |
|---|---|---|
| DE | 36 14 165 A1 | 4/1986 |
| DE | 40 16 033 A1 | 5/1990 |
| EP | 0 0430203 B1 | 6/1982 |
| EP | 0 422 938 A1 | 4/1990 |
| EP | 0 532 372 A1 | 3/1993 |
| EP | 0 727 345 A3 | 2/1996 |
| EP | 0 727 345 A2 | 2/1996 |
| WO | WO 94/19145 | 2/1994 |

* cited by examiner

Primary Examiner—M. Alexandra Elve
Assistant Examiner—Jonathan Johnson
(74) Attorney, Agent, or Firm—Young & Basile, P.C.

(57) ABSTRACT

A plurality of robots are positioned on a rotatable table for transporting parts to be processed through a plurality of work stations positioned around the periphery of the table. Each robot can carry a workpiece from one work station to the next. The rotation of the table moves the robot from one workstation to the next while carrying a part to be processed. Each robot can be independently movable relative to the other robots and each robot can be independently movable relative to the table. Each robot can include a welder for processing the workpiece independent of the workstation or during movement between work stations. Each robot can carry a plurality of differently configured workpieces between the work stations.

18 Claims, 2 Drawing Sheets

ROBOTIC TURNTABLE

CROSS-REFERENCE TO RELATED APPLICATIONS

This application is a divisional of prior application Ser. No. 09/813,766 for a ROBOTIC TURNTABLE, filed on Mar. 21, 2001 now U.S. Pat. No. 6,435,397 which claimed the benefit of prior provisional application Ser. No. 60/197,614 filed Apr. 18, 2000.

FIELD OF THE INVENTION

The present invention relates to a plurality of robots positioned on a turntable at spaced locations along the periphery, where the turntable is movable in rotation to predetermined angular positions independently of movement of the individual robots disposed thereon.

BACKGROUND OF THE INVENTION

A modular robotic finishing work center is disclosed in U.S. Pat. No. 4,644,897. The patent discloses an elevated platform with a turntable mounted thereon which is rotatable about a vertical axis, and a robot manipulator fixedly mounted relative to the vertical axis, wherein the turntable ends are rotatable through a circular path where at least part of the path includes a partially protected booth for collecting paint residue and overspray. The robot manipulator has a movable arm and spray applicator capable of movement along a limited range so as to provide a predetermined envelope of possible work areas for spray finishing, where a portion of the turntable end path and at least a portion of the spray booth are included within this envelope.

A tool turntable for a manufacturing system is disclosed in U.S. Pat. No. 5,186,304. The production line manufacturing system includes a programmable multi-position rotatable unit that can be used in each of the work stations to accommodate both changes in workpieces to be processed and tools. The rotatable unit includes a four-position horizontally arranged fixture table including four vertically arranged fixtures movably mounted thereon. A precision locator key on each of the fixtures positions each individual fixture on the table and also serves as a positive fixture stopped in the work position.

SUMMARY OF THE INVENTION

It would be desirable in the present invention to provide a turntable or a carousel with a plurality of robots positioned thereon in peripherally spaced locations with respect to one another for movement about a vertical axis of the turntable while allowing independent movement of each of the individual robots positioned thereon. The apparatus for manufacturing parts according to the present invention can include a turntable having an outer periphery and a centrally located axis of rotation, a plurality of robots positioned at peripherally spaced locations about the turntable with respect to one another for independent movement with respect to one another and with respect to movement of the turntable, and a control system for controlling and synchronizing independent individual movements of the robots with rotation of the turntable to move each individual robot from one work station at a first angular position to another work station at a second angular position.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
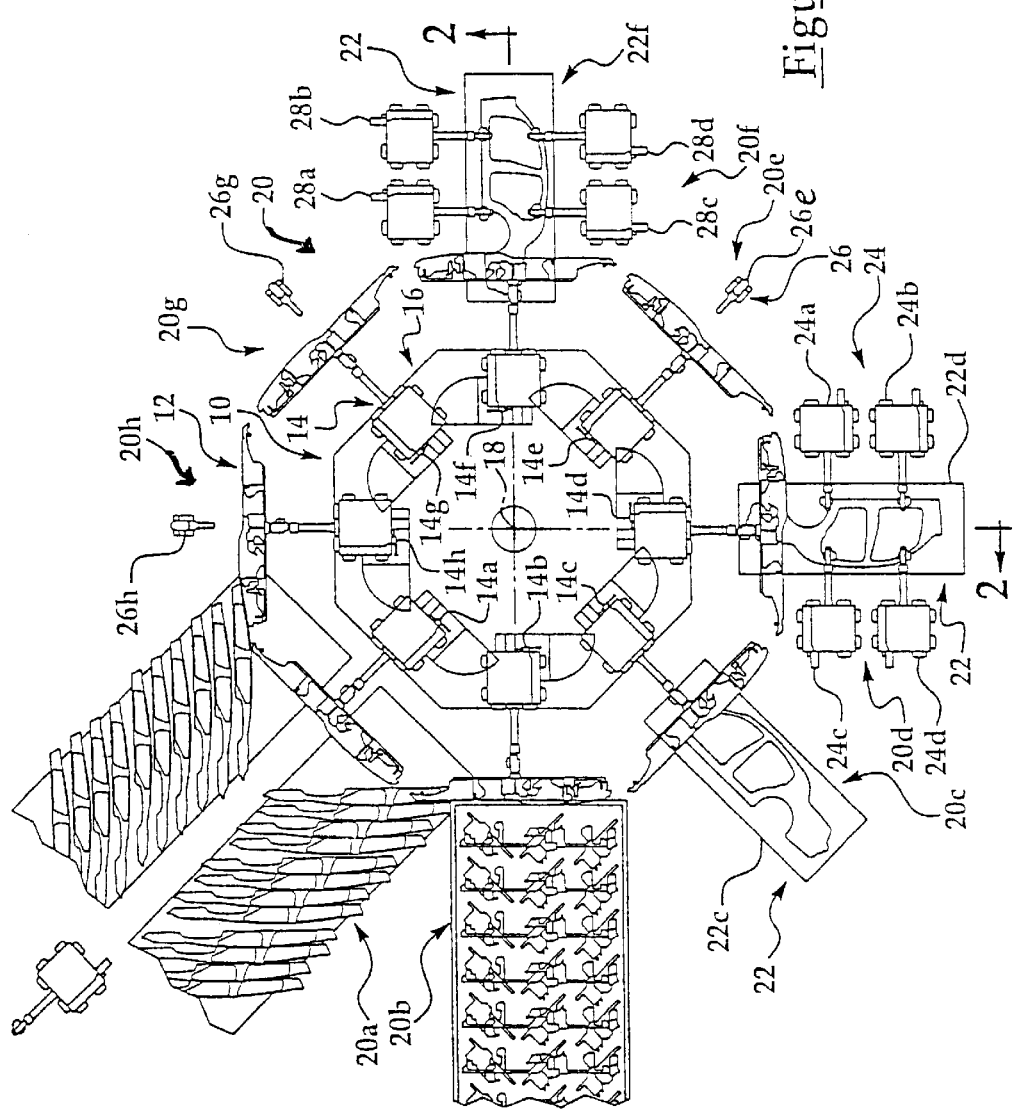
FIG. 1 is a simplified plan view of a robotic turntable or carousel according to the present invention for manufacturing parts.

An apparatus 10 according to the present invention provides for the manufacturing of parts 12 by a plurality of robots 14 positioned on a turntable 16 for rotation about an axis 18. The robots are positioned at different locations spaced along the outer periphery of the turntable 16. In the illustrated embodiment, there are an equal number of robots 14 to the number of work stations 20 positioned around the periphery of the turntable 16, although an equal number of robots to work stations is not required to practice the present invention. By way of example, and not limitation, the present invention will be described in detail with respect to the manufacture of particular parts 12, such as a side panel sub assembly of a motor vehicle.

Referring now to FIG. 1, the turntable 16 is illustrated having eight robots 14a, 14b, 14c, 14d, 14e, 14f, 14g, 14h disposed at evenly spaced angular positions around the outer peripheral edge of the turntable 16. The robots 14a–14h are independently movable with respect to one another, and are movable independent of movement of the turntable 16. When the turntable 16 is disposed at a first angular position, such as that illustrated in FIG. 1, each robot 14 is capable of performing various independent work cycles at the individual work station 20 corresponding to its current location. By way of example and not limitation, in the position illustrated in FIG. 1, the robot 14a is positioned at work station 20a for unloading parts that have been processed. After unloading a part, the turntable 16 can be rotated about the axis 18 to now position the robot 14a at the position previously occupied by robot 14b. In this position, the robot has access to a tool change work station 20b in order to provide the opportunity to change the tooling as required for the particular part to be processed next.

After completion of the tool change, if any, at work station 20b, the turntable 16 can be rotated again about the axis 18 to move the robot 14a from the position previously shown for robot 14b to the position previously shown for robot 14c. When in this position, the robot can pick up a part to be processed at the part loading fixture 22 at work station 20c. Preferably, the fixture 22 located at the work station 20c is an indexing part load fixture 22c capable of positioning a plurality of fixtures corresponding to the desired body style and model to be processed through the work station 20c. In its most preferred configuration, the indexing fixture 22c includes four different fixtures positioned on four major surfaces of a rectangular fixture rotatable about a horizontal axis to position one of the four major surfaces in an upright ready position for receiving parts to be loaded onto or picked up by the robot at work station 20c.

After the robot has retrieved the part to be processed from the work station 20c, the turntable 16 is rotated about the axis 18 to bring the robot 14a into the position previously illustrated for robot 14d corresponding to work station 20d. At work station 20d, the robot 14a positions the part 12 into the fixture 22d allowing additional work to be performed on the part. The fixture 22d is preferably an indexing part fixture similar to fixture 22c. The fixture 22d preferably has four major surfaces with different fixtures for various models and body styles to be processed. The fixture is rotatable about a horizontal axis to bring a selected one of the four major surfaces into an upright ready position for receiving the next part to be processed. The additional work can include the attachment and assembly of various sub components to the part, or the clamping and welding of various components at different positions on the part, or any other automated processing required with respect to the particular part being processed through the apparatus 10 according to the present invention. The processing can include assembly and/or welding by additional robots 24a–24d disposed at work station 20d. One or more robots 24 can be positioned at the work station 20d as required for the particular part processing to take place at the particular work station. After the processing of the part is completed at work station 20d and the robot 14a retrieves the part from the fixture 22d, the turntable 16 is rotated about the axis 18 to move the robot 14a to the position previously illustrated for robot 14e. At this position, additional processing can take place as required for the particular part. By way of example and not limitation, the illustration shows a respot work station 20e for welding areas of the part inaccessible while resting in the fixture 22d of work station 20d. A respot welder 26 can be positioned at each respot work station, such as welder 26e at work station 20e.

After respotting has been completed at the work station 20e, the turntable 16 can be rotated about axis 18 to position the robot 14a in the position previously shown for robot 14f. The part can be loaded by the robot into the fixture 22f at the work station 20f. The fixture 22f preferably can be an indexing part fixture similar to 22d and 22c previously described. In the most preferred configuration, the indexing part fixture 22f is provided as a rectangular fixture having four major surfaces with different fixtures for the various models and body styles to be processed through the apparatus 10 according to the present invention. The rectangular fixture is rotatable about a horizontal axis to bring a selected one of the four major fixture surfaces into an upright ready position for receiving the part to be processed. The processing at the work station 20f can include assembly of additional sub components to the primary part being assembled, or additional clamping and welding of various portions of the part to one another. Additional robots 26a–26d can be provided at the work station 20f to perform the assembly or welding operations as required.

When processing of the part has been completed at the work station 20f, the turntable 16 can be rotated about the axis 18 to position the robot 14a at the position previously illustrated for robot 14g. Additional processing of the part can take place at work station 20g when the robot is in this position. By way of example and not limitation, a respot welding apparatus 26g can be provided to weld portions of the part 12 being assembled that could not be accessed while the part was positioned in the fixture at work station 20f.

After respotting has been completed, the turntable 16 can be rotated about the axis 18 to position the robot 14a at the position previously illustrated for robot 14h. At this position, the part can be subjected to additional processing, by way of example and not limitation, such as additional respot welding by a respot welding apparatus 26h at work station 20h. When the additional processing is completed at work station 20h, the turntable 16 can be rotated about the axis 18 to again bring the robot 14a to the position illustrated as 14a in FIG. 1 where the processed part can be unloaded at the work station 20a.

While the invention has been described in detail with respect to a single robot 14a being rotated through the various work stations around the periphery of the turntable 16, it should be apparent to those skilled in the art that the additional robots 14b, 14c, 14d, 14e, 14f, 14g, 14h positioned on the turntable 16 perform the same operations at the various work stations while rotated through the various work station positions 20b, 20c, 20d, 20e, 20f, 20g, 20h, and that work is simultaneously performed at each work station by each of the robots 14a–14h prior to the turntable being moved to transfer the robots 14a–14h and parts carried by the robots 14a–14h to the next work station 20a–20h in the processing system.

Figure 2:
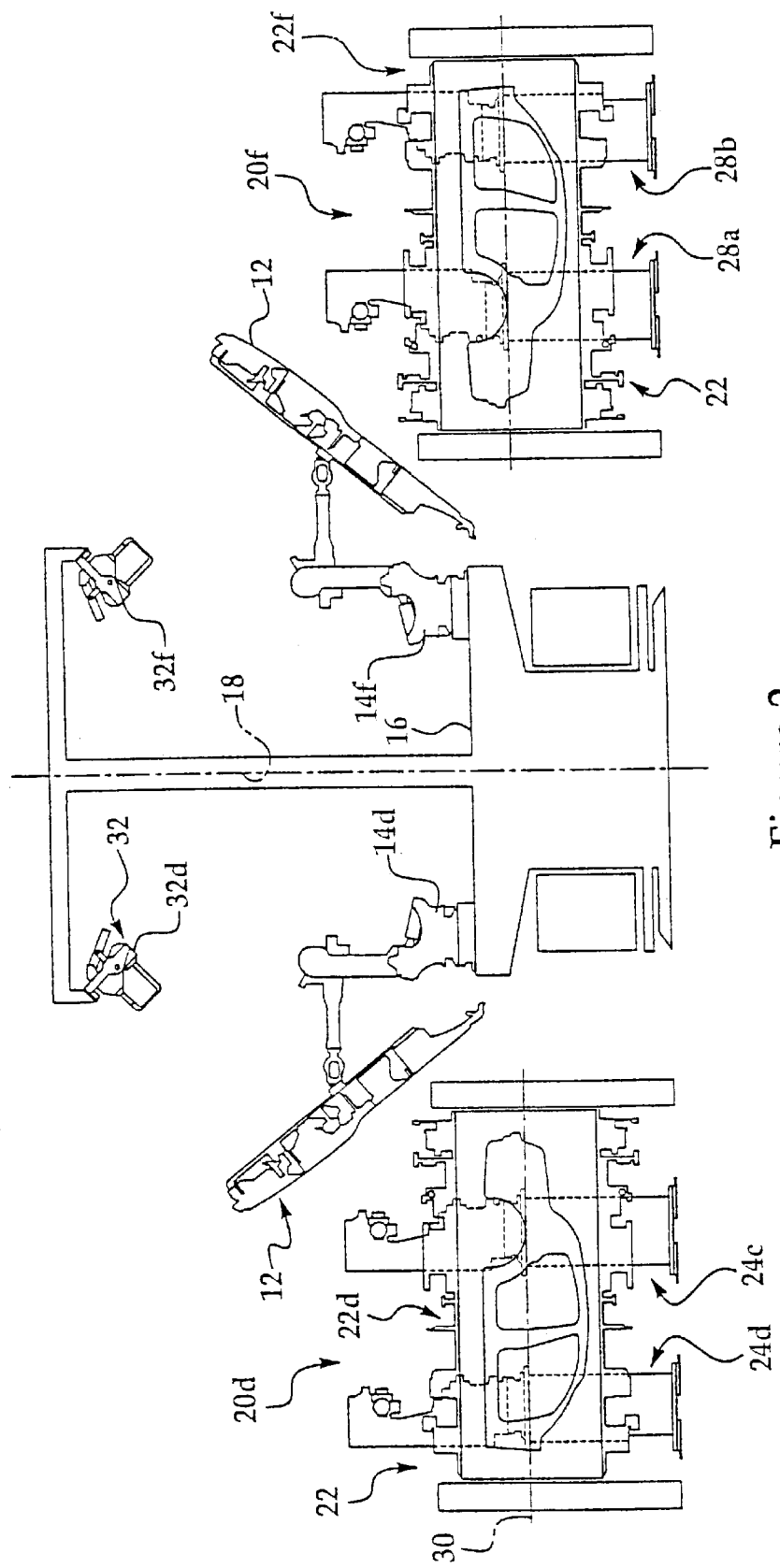
FIG. 2 is a side elevational view of a robotic turntable according to the present invention including a plurality of robots individually operating with respect to different work stations on opposite sides of the turntable.

Referring now to FIG. 2, a cross-sectional elevational view is shown of the robots 14d, 14f on the turntable 16 according to the present invention through work station 20d and work station 20f. As previously described, the robots 14d and 14f can transport workpieces 12 to the work station 20d and 20f respectively and can load the parts into a corresponding fixture 22d, 22f for the particular part to be processed. Each of the indexing fixtures 22d, 22f at the work stations 20d and 20f can be in the form of a rectangular fixture having four major surfaces with different fixture configurations for the various body styles and models to be processed through the work stations. Each of the fixtures 22 is rotatable about an axis 30 to position the desired fixture in the upright ready position for receiving the part to be delivered by the corresponding robot presently positioned at that work station. Welders 32 can be positioned above each of the robots 14, as can best be seen in FIG. 2 where welder 32d is positioned above robot 14d and welder 32f is positioned above robot 14f. The welders 32 positioned above the robots 14 allow additional welding to be performed during a movement cycle of the turntable 16, or while one work station is waiting for completion of work being performed at another work station. In this way, additional work can be performed by the robot 14 and welder 32 between cycles performed at various work stations. The part can be manipulated and moved as required to perform multiple welds with the welders 32, or the respot welders 26e, 26g, 26h at the work stations 20e, 20g and 20h.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for moving a workpiece along an assembly line having a plurality of workstations, the apparatus comprising:

a plurality of robots mounted for movement along a fixed path between workstations, each robot for manipulating at least one workpiece; and a rotatable turntable supporting the plurality of robots for simultaneous movement between the plurality of workstations.

2. The apparatus of claim 1 wherein at least one workstation further comprises:

at least one fixture for retaining each one of a plurality of different configurations of workpiece to be moved through the assembly line.

3. The apparatus of claim 1 wherein each of the plurality of robots further comprises:

means for delivering the workpiece to a fixture located at one of the plurality of workstations.

4. The apparatus of claim 1 further comprising:

interchangeable means for manipulating a plurality of different configurations of workpieces.

5. The apparatus of claim 1 further comprising:

at least one welder mounted in fixed relation with respect to each robot for movement along the fixed path, each welder for performing a welding operation on the workpiece while being manipulated by the corresponding robot between delivery to successive workstations.

6. The apparatus of claim 1 wherein the plurality of robots are evenly spaced from each other.

7. The apparatus of claim 1 wherein a number of robots mounted along the fixed path is equal to a number of workstations positioned adjacent to the fixed path.

8. The apparatus of claim 1 wherein each of the plurality of robots further comprises:

means for manipulating the workpiece relative to the rotatable turntable.

9. The apparatus of claim 1 wherein each of the plurality of robots further comprises:

means for manipulating the workpiece relative to at least one other robot, the other robot mounted along the fixed path and associated with at least one of the plurality of workstations.

10. The apparatus of claim 1 further comprising:

a single movable platform supporting the plurality of robots for movement along the fixed path between workstations.

11. A method for moving a workpiece along an assembly line having a plurality of workstations, the method comprising the steps of:

manipulating each workpiece to be processed with one of a plurality of robots, each robot mounted for movement along a fixed path between workstations; and supporting the plurality of robots on a rotatable turntable for simultaneous movement between the plurality of workstations.

12. The method of claim 11 further comprising the step of:

performing at least one welding operation on each workpiece while the workpiece is being manipulated by the corresponding robot moving the workpiece along the assembly line between successive workstations.

13. The method of claim 11 further comprising the step of:

performing at least one welding operation on each workpiece while the robots are moving along the fixed path.

14. The method of claim 11 further comprising the step of:

interchanging manipulating means for manipulating a second workpiece having a different configuration.

15. The method of claim 11 further comprising the step of:

positioning at least one fixture for retaining each one of a plurality of different configurations of workpiece to be moved through the assembly line at a workstation.

16. The method of claim 11 wherein the manipulating step further comprises the step of:

manipulating the workpiece relative to the rotatable turntable.

17. The method of claim 11 wherein the manipulating step further comprises the step of:

manipulating the workpiece relative to at least one other robot, the other robot mounted along the fixed path and associated with at least one of the plurality of workstations.

18. The method of claim 11 further comprising the step of:

supporting the plurality of robots for movement along the fixed path between workstations on a single movable platform.

* * * * *